US010117070B2

(12) United States Patent
Zisimopoulos et al.

(10) Patent No.: US 10,117,070 B2
(45) Date of Patent: Oct. 30, 2018

(54) APPARATUS AND METHOD OF GROUP COMMUNICATIONS

(71) Applicant: QUALCOMM Incorporated, San Diego, CA (US)

(72) Inventors: Haris Zisimopoulos, London (GB); Miguel Griot, La Jolla, CA (US); Arungundram Chandrasekaran Mahendran, San Diego, CA (US); Farrokh Khatibi, San Diego, CA (US)

(73) Assignee: QUALCOMM, Incorporated, San Diego, CA (US)

( * ) Notice: Subject to any disclaimer, the term of this patent is extended or adjusted under 35 U.S.C. 154(b) by 0 days.

(21) Appl. No.: 14/425,295

(22) PCT Filed: Oct. 2, 2012

(86) PCT No.: PCT/GB2012/052437
§ 371 (c)(1),
(2) Date: Mar. 2, 2015

(87) PCT Pub. No.: WO2014/053797
PCT Pub. Date: Apr. 10, 2014

(65) Prior Publication Data
US 2015/0230065 A1    Aug. 13, 2015

(51) Int. Cl.
*H04M 3/42* (2006.01)
*H04W 4/08* (2009.01)
(Continued)

(52) U.S. Cl.
CPC ............ *H04W 4/08* (2013.01); *H04L 12/185* (2013.01); *H04W 4/38* (2018.02); *H04W 4/70* (2018.02); *H04W 8/04* (2013.01); *H04W 84/042* (2013.01)

(58) Field of Classification Search
CPC ...... H04W 4/12; H04W 4/14; H04L 29/08108
(Continued)

(56) References Cited

U.S. PATENT DOCUMENTS 6,466,552 B1 * 10/2002 Haumont .............. H04W 8/186
370/310
8,824,997 B2 * 9/2014 Gehlen ...................... 455/404.1
(Continued)

OTHER PUBLICATIONS

3rd Generation Partnership Project; Technical Specification Group Services and System Aspects; Architecture enhancements to facilitate communications with packet data networks and applications (Release 11), Sep. 11, 2012 (Sep. 11, 2012), 3GPP Standard; 3GPP TS 23.682, 3rd Generation Partnership Project (3GPP), Mobile Competence Centre ; 650, Route Des Lucioles ; F-06921 Sophia-Antipolis Cedex; France, pp. 1-29, XP050649060.
(Continued)

*Primary Examiner* — Anthony Addy
*Assistant Examiner* — Matthew Genack
(74) *Attorney, Agent, or Firm* — Arent Fox, LLP and Qualcomm

(57) ABSTRACT

A method, an apparatus, and a computer program product for group communications are provided. Subscriber information is obtained for each of a device in a group identified in a group message request. An appropriate mechanism for delivering a group message to each device or subset of devices within the group is determined based on device capability information.

18 Claims, 7 Drawing Sheets

(51) Int. Cl.

| | | |
|---|---|---|
| *H04L 12/18* | (2006.01) | |
| *H04W 8/04* | (2009.01) | |
| *H04W 4/38* | (2018.01) | |
| *H04W 4/70* | (2018.01) | |
| *H04W 84/04* | (2009.01) | |

(58) Field of Classification Search
USPC .................................. 455/412.1, 414.1, 466
See application file for complete search history.

(56) References Cited

U.S. PATENT DOCUMENTS

| | | | | |
|---|---|---|---|---|
| 2005/0232292 | A1* | 10/2005 | Richards ............. | H04W 72/005 370/432 |
| 2008/0020762 | A1* | 1/2008 | Fischer ............... | H04W 72/005 455/435.1 |
| 2012/0149404 | A1* | 6/2012 | Beattie, Jr. ......... | H04M 1/72547 455/466 |
| 2013/0083653 | A1* | 4/2013 | Jain ...................... | H04W 4/005 370/230 |
| 2013/0155954 | A1* | 6/2013 | Wang .................... | H04W 4/005 370/328 |
| 2014/0011505 | A1* | 1/2014 | Liao ..................... | H04W 68/025 455/450 |
| 2015/0230063 | A1* | 8/2015 | Chandramouli ........ | H04W 4/70 455/466 |

OTHER PUBLICATIONS

"3rd Generation Partnership Project; Technical Specification Group Services and System Aspects; Machine-Type and other Mobile Data Applications Communications Enhancements (Release 12)", 3GPP Standard; 3GPP TR 23.887, 3rd Generation Partnership Project (3GPP), Mobile Competence Centre; 650, Route Des Lucioles; F-06921 Sophia-Antipolis Cedex; France, vol. SA WG2, No. V0.2.1, Aug. 14, 2012 (Aug. 14, 2012), pp. 1-32, XP050649021.

Interdigital Communications: "Triggering a detached MTC device", 3GPP Draft; S2-110673 Triggering_a_Detached_Device_Disc, 3rd Generation Partnership Project (3GPP), Mobile Competence Centre; 650, Route Des Lucioles; F-06921 Sophia-Antipolis Cedex; France, vol. SA WG2, No. Salt Lake City; Feb. 21, 2011, Feb. 15, 2011 (Feb. 15, 2011), pp. 1-4, XP050523859.

International Search Report and Written Opinion—PCT/GB2012/052437—ISA/EPO—dated Jun. 21, 2013.

KPN: "Group based addressing solution from 23.888", 3GPP Draft; S2-122753, 3rd Generation Partnership Project (3GPP), Mobile Competence Centre ; 650, Route Des Lucioles ; F-06921 Sophia-Antipolis Cedex, France, vol. SA WG2, no Barcelona, Spain; Jul. 9, 2012-Jul. 13, 2012, Jul. 3, 2012 (Jul. 3, 2012), XP050633281.

KPN et al., "Batch wise triggering", 3GPP Draft; S2-113445, 3rd Generation Partnership Project (3GPP), Mobile Competence Centre; 650, Route Des Lucioles; F-06921 Sophia-Antipolis Cedex; France, vol. SA WG2, No. Naantali; Jul. 11, 2011, Jul. 5, 2011 (Jul. 5, 2011), pp. 1-6, XP050548717.

Samsung: "MTC Group messaging solution", Oct. 1, 2012 (Oct. 1, 2012), 3GPP Draft; S2-123725, 3rd Generation Partnership Project (3GPP), Mobile Competence Centre; 650, Route Des Lucioles; F-06921 Sophia-Antipolis Cedex; France, XP050683284, pp. 1-7.

\* cited by examiner

APPARATUS AND METHOD OF GROUP COMMUNICATIONS

CROSS-REFERENCE TO RELATED APPLICATION(S)

This application is a national phase of PCT Application Serial No. PCT/GB2012/052437, entitled "APPARATUS AND METHOD OF GROUP COMMUNICATIONS," filed on Oct. 2, 2012, which is expressly incorporated by reference herein in its entirety.

BACKGROUND

Field

The present disclosure relates generally to communication systems, and more particularly, to group communications, including group communications for machine-type communications (MTC).

Background

For group triggering communication, a multitude of group trigger delivery mechanisms may require support. For example, it is not yet clear whether one or more delivery mechanisms will be standardized. Moreover, different types of devices have different communication needs, and different radio access technologies (RATs) may only support some of the mechanisms (e.g., long term evolution (LTE) does not support general purpose cell broadcast service (CBS)—Backwards compatibility). In some instances, group members may be spread across various public land mobile networks (PLMNs) having differing capabilities. The serving PLMN and user equipment (UE) capability have to be taken into consideration before delivering a group message. The same group message may need to be delivered using different delivery mechanisms (e.g., some devices may use CBS while others use multimedia broadcast multicast service (MBMS), unicast, etc.) A preconfigured group delivery mechanism may be used for all devices in all cases. In this configuration, UEs are required to send an acknowledgement that they have received the trigger. For UEs that have not received the group trigger, the service capability server (SCS) initiates point-to-point triggering afterwards. However, this mechanism is inefficient, as it relies on all group members having to send acknowledgements, which may cause uplink (UL) congestion.

SUMMARY

In accordance with some aspects, a method for group communication comprises obtaining subscriber information for each device in a group identified in a group message request; and determining, by a decision component, one or more message delivery mechanisms for delivering a group message to each device or subgroup of devices in the group identified by the group identifier. The determining is based, at least in part, on device capability information provided by each device in the group identified by the group identifier.

DETAILED DESCRIPTION

Figure 1:
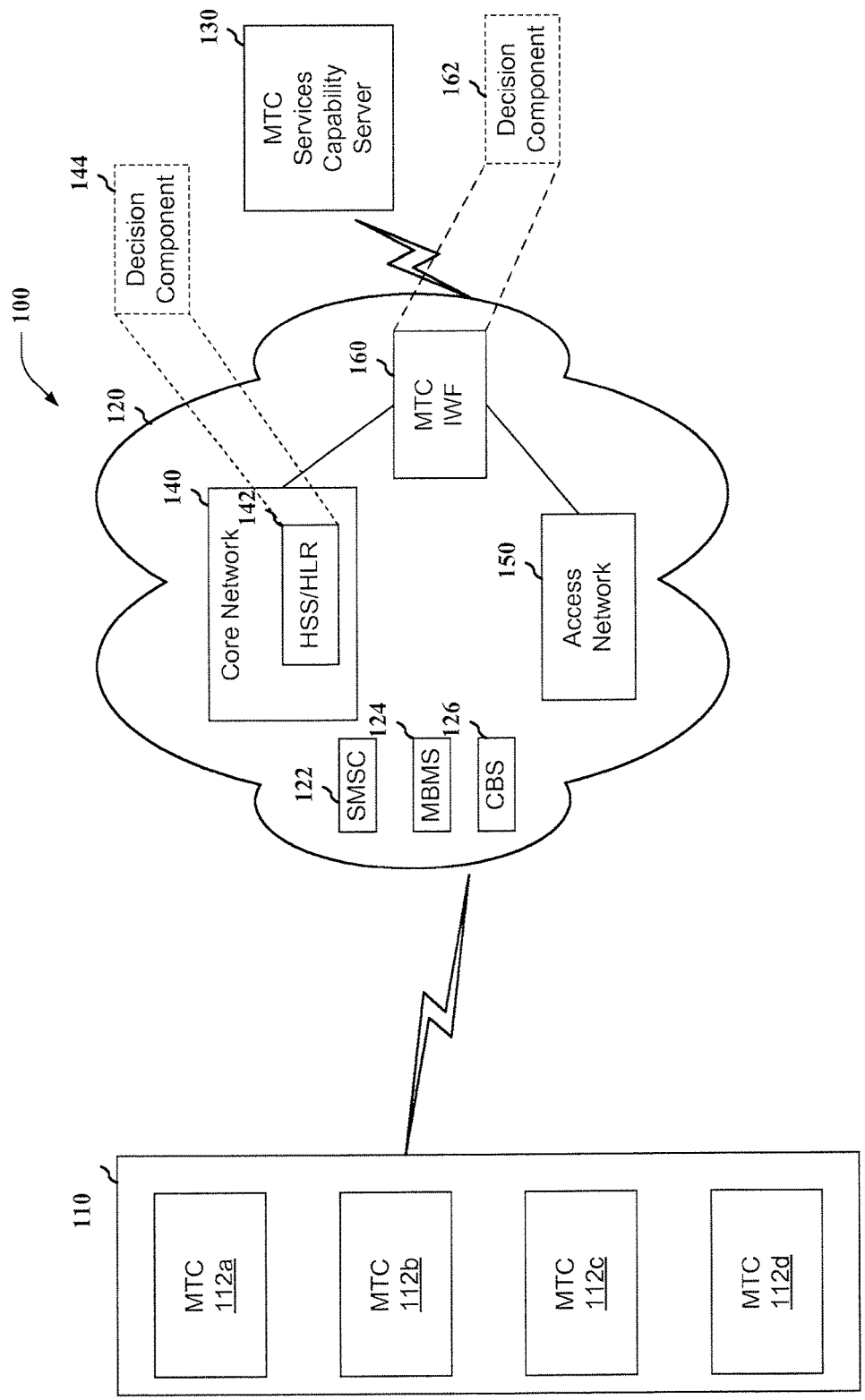
FIG. 1 is a diagram illustrating an example communication system for group communication.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawing by various blocks, modules, components, circuits, steps, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented with a "processing system" that includes one or more processors. Examples of processors include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise. The software may reside on a computer-readable medium. The computer-readable medium may be a non-transitory computer-readable medium. A non-transitory computer-readable medium include, by way of example, a magnetic storage device (e.g., hard disk, floppy disk, magnetic strip), an optical disk (e.g., compact disk (CD), digital versatile disk (DVD)), a smart card, a flash memory device (e.g., card, stick, key drive), random access memory (RAM), read only memory (ROM), programmable ROM (PROM), erasable PROM (EPROM), electrically erasable PROM (EEPROM), a register, a removable disk, and any other suitable medium for storing software and/or instructions that may be accessed and read by a computer. The computer-readable medium may also include, by way of example, a carrier wave, a transmission line, and any other suitable medium for transmitting software and/or instructions that may be accessed and read by a computer. The computer-readable medium may be resident in the processing system, external to the processing system, or distributed across multiple entities including the processing system. The computer-readable medium may be embodied in a computer-program product. By way of example, a computer-program product may include a computer-readable medium in packaging materials. Those skilled in the art will recognize how best to implement the described functionality presented throughout this disclosure depending on the particular application and the overall design constraints imposed on the overall system.

The methods and apparatus described herein seek to optimize group message delivery, for example, in a machine-type communication system. A group identifier may be used in determining the appropriate measures for triggering/reaching devices that are members of a group. In some aspects, a machine-type communications (MTC) interworking function may be configured to determine the message delivery mechanism for a group. In other aspects, the decision may be made by the home subscriber server (HSS)/home location register (HLR). The decision may be based on criteria such as, for example, policy, server PLMN-id, UE capabilities, etc. Available delivery mechanisms for triggering/reaching a device may be obtained by subscription and/or capability information received from the devices, serving networks and their respective serving nodes, network policy in the form of roaming agreements, and/or other mechanisms.

FIG. 1 is a block diagram illustrating an example of a communication system 100 for group communications, according to various aspects of the disclosure. For example, communication system 100 may be configured to support machine-type communications (MTC). While this example is directed to an MTC implementation, other types of communication are also supported.

As shown in FIG. 1, one or more MTC devices 112a-d may be part of an MTC group 110, and may be communicatively coupled to an MTC services capability server (SCS) 130 via service network 120. Service network 120 may include core network 140, access network 150, and MTC interworking function (MTC IWF) 160. Core network 140 may include a home subscriber server (HSS)/home location register (HLR) 142, which may store device capability information for each MTC device 112 as well as network capability information. For example, HSS/HLR 142 may be configured to receive capability information from each MTC device 112. In some aspects, HSS/HLR 142 may include a decision component 144 configured to select an appropriate delivery mechanism for transmitting a group message to each MTC device 112 in the MTC group 110, and to provide this information to MTC IWF 160. Each device 112 may be configured to transmit group capability information to the HSS/HLR.

MTC IWF 160 may be configured to receive a request to transmit a group message to MTC group 110 from MTC SCS 130. In some aspects, where HSS/HLR 142 contains the decision component 144, MTC IWF 160 may be configured to request and receive information from the HSS/HLR 142 indicating the appropriate transmission mechanism for transmitting the group message to each MTC device 112 in the MTC group 110, and may forward the message to the devices using the designated transmission mechanism. In other aspects, MTC IWF 160 may include a decision component 162, and may be configured to receive subscriber information from the HSS/HLR 142, and to determine appropriate transmission mechanisms based on the received subscriber information.

In accordance with some aspects, service network 120 may be configured to communicate with each device 112 in MTC group 110 via one or more communication mechanisms. For example, service network 120 may be configured to communicate via a point-to-point protocol, such as SMS 122, or via one or more broadcast/multicast services, such as multimedia broadcast multicast service (MBMS) 124 or cell broadcast service (CBC) 126. Each MTC device 112 may support one or more of the communication protocols.

Figure 2:
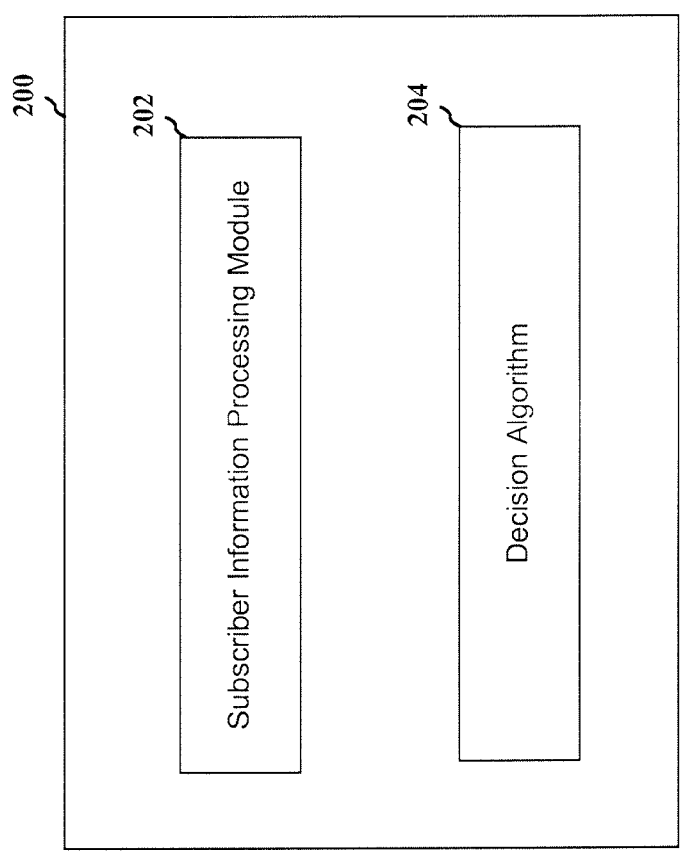
FIG. 2 is a conceptual block diagram illustrating a decision component.

Turning now to FIG. 2, a decision component 200 for determining an appropriate transmission mechanism is shown. Decision component 200 may be implemented by decision component 144 or 162. As shown in FIG. 2, decision component 200 may include a subscriber information processing module 202 configured to receive subscriber information. For example, where decision component 200 is implemented by an HSS/HLR via decision component 144, decision component 200 may receive device capability information from each device. When decision component 200 is implemented by MTC IWF via decision component 162, decision component 200 may receive the device capability information from the HSS/HLR.

Decision component 200 may also include a delivery mechanism determining component 204 configured to select an appropriate transmission mechanism. Delivery mechanism determining component 204 may be configured select appropriate delivery mechanisms based on the device capability information, the serving PLMN associated with each device, and/or any policies in place for communicating with the MTC devices. As a one-to-many communication protocol, such as MBMS or CBS is more efficient, decision algorithm 204 may be configured to always select a one-to-many communication protocol when available. In some aspects, decision algorithm 204 may be configured to select a one-to-many communication protocol for communicating with a first plurality of MTC device supporting the one-to-many protocol, and to select a point-to-point protocol, such as SMS, for communicating with any devices in the group that do not support a one-to-many protocol.

Figure 3:
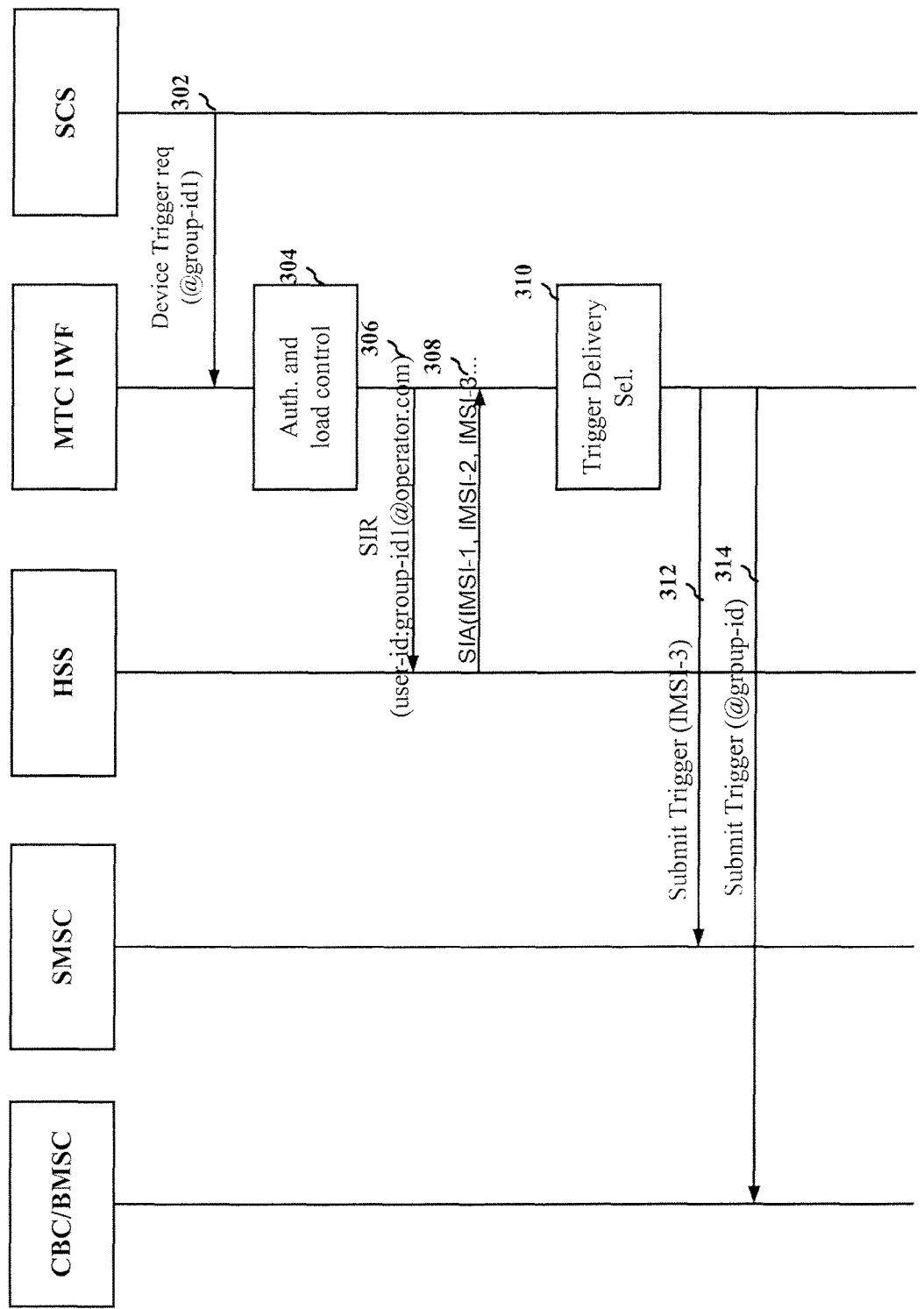
FIG. 3 is a call-flow diagram illustrating a method for group communication.

As described above, the HSS/HLR and/or the MTC-IWF may be configured to determine appropriate delivery mechanisms. FIG. 3 is call-flow diagram illustrating an example of communications when the decision is made by the MTC-IWF. Communications among a CBS/BMSC, SMSC, HSS, MTC IWF, and SCS are shown in FIG. 3. As shown at 302, the SCS transmits a group message request, such as a device trigger request, to the MTC IWF. The group message group may include an identifier associated with a group to which the message is directed. For example, as shown in FIG. 3, the device trigger request is to be sent to a group designated "group-id1." As shown at 304, the MTC IWF performs authorization and load control.

As shown at 306, the MTC IWF submits a subscriber information request (SIR) to the HSS/HLR. The SIR contains the group identifier ("group-id1") associated with the group. In response, the HSS/HLR provides to the MTC IWF a subscriber information answer (SIA) including the group identifier and information related to each device within the group, as shown at 308. For example, the SIA may include a user identifier and service data for each group member, as well as a PLMN identifier for each group member. The service data may include, for example, an indication of the delivery protocols supported by each device, and the serving node for contacting each device. For example, a first device having a device identifier IMSI-1 may support point-to-point delivery as well as group delivery, while a device having a device identifier IMSI-3 may support only point-to-point delivery. The service data for IMSI-1, in this example, would include both the address of the SMS server as well as the address of the BMSC or CBC server.

Based on the received information, the MTC IWF may select an appropriate message delivery mechanism for each device, as shown at 310. As shown at 312, the MTC IWF may transmit the message to the SMSC for one or more of the group members supporting only point-to-point delivery. For example, as shown in FIG. 3, the message may be transmitted to the device having identifier IMSI-3 via the SMSC. As shown at 314, the MTC IWF may transmit the message via a one-to-many protocol for two or more of the group members. As show n at 314, a group message is transmitted, using the group identifier, to the CBS or BMSC. In some aspects, the MTC IWF may be configured to map the group ID to a temporary mobile group identifier (TMGI) or other message identifier associated with the message. As such, the group message transmitted at 312 may also include the TMGI or other message identifier. In other aspects, the mapping may be performed by the CBC/BMSC.

Figure 4:
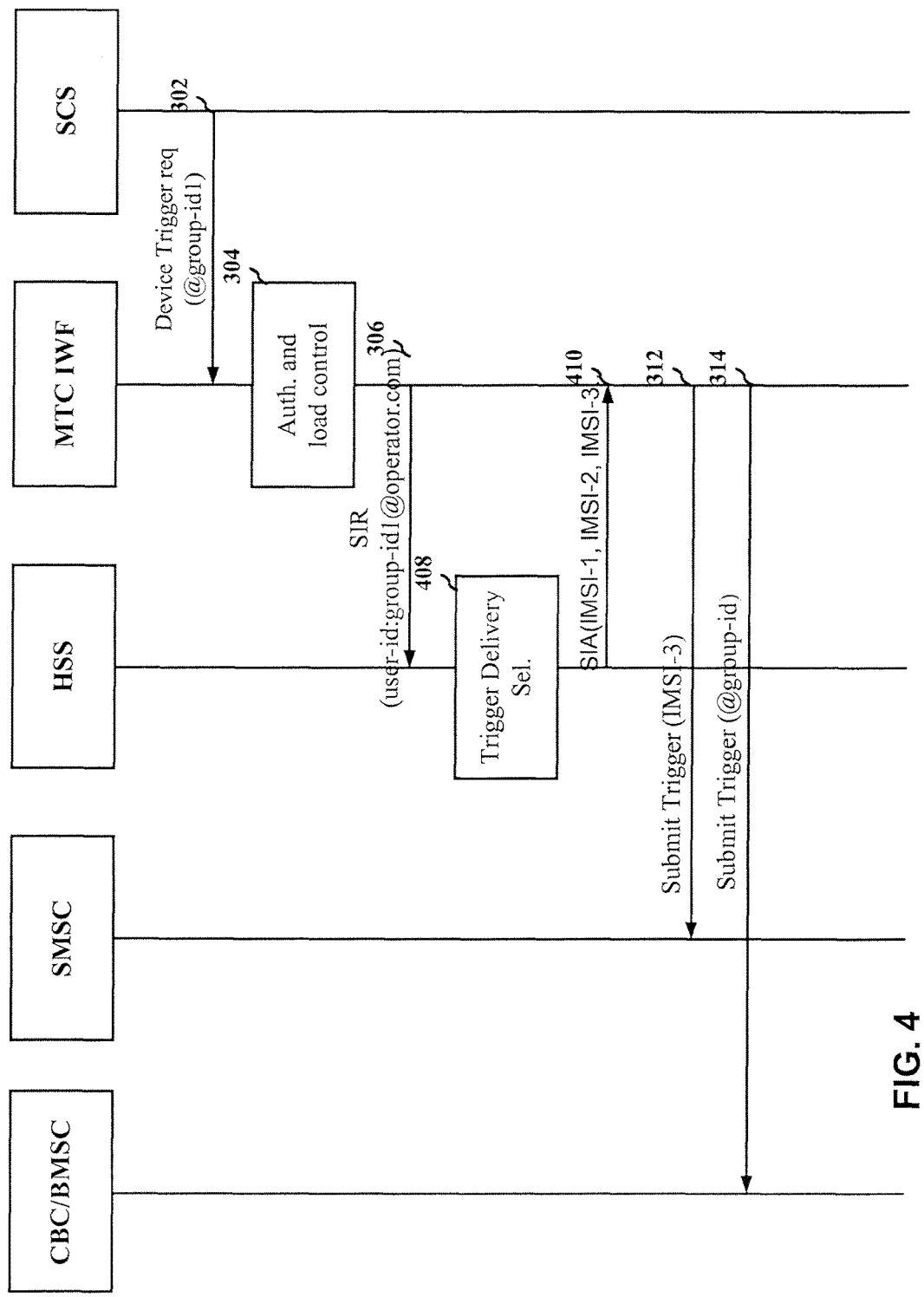
FIG. 4 is another call-flow diagram illustrating a method for group communication.

FIG. 4 is another call-flow diagram depicting communications when the transmission mechanism decision is made by the HSS/HLR. Messages 302, 304, and 306 are the same as described above with respect to FIG. 3. As shown at 408, the HSS/HLR determines appropriate transmission mechanisms. As shown at 410, the SIA returned by the HSS/HLR includes the service data associated only with the selected transmission mechanism for each device. Messages 312 and 314 are the same as shown in FIG. 3.

Figure 5:
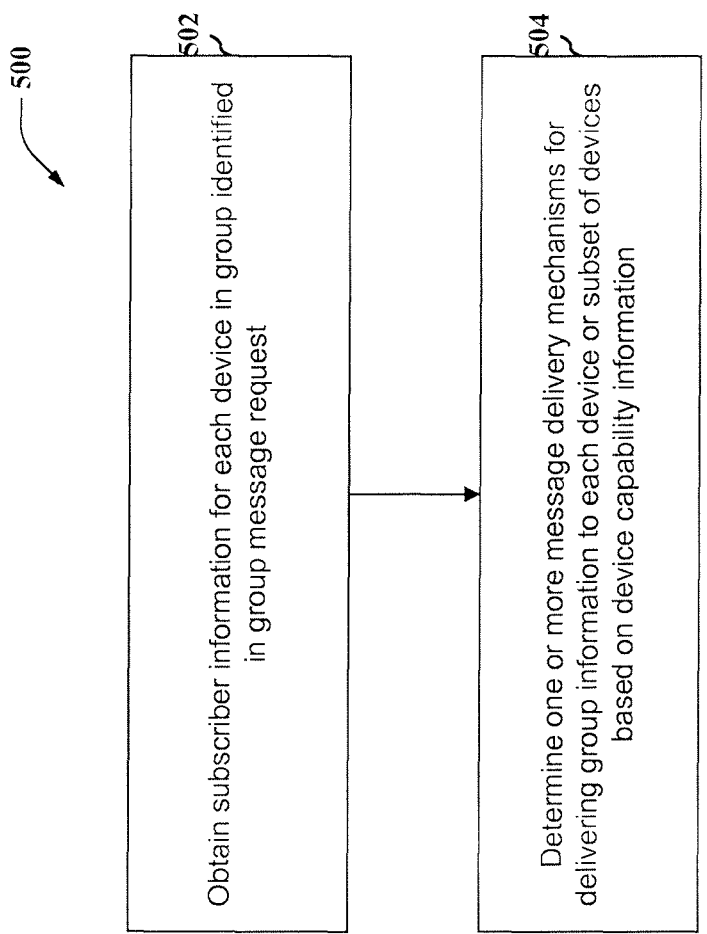
FIG. 5 is a flowchart illustrating, an example of a method of group communication.

Turning now to FIG. 5, a method 500 for group communication is shown, in accordance with some aspects. The method 500 may be performed, for example, by HSS/HLR 142 and/or MTC IWF 160 shown in FIG. 1. As depicted at 502, subscriber information for each device in a group identified in a group message request may be obtained. For example, where the method is performed by the HSS/HLR, the subscriber information may be obtained from each device. Where the method is performed by the MTC IWF, the subscriber information may be obtained from the HSS/HLR.

As shown at 504, one or more message delivery mechanisms for delivering a group message to each device identified by the group identifier may be determined. The determination may be based on device capability information provided by each device in the group identified by the group identifier. For example, the device capability information may indicate whether the device supports one or more one-to-many communication protocols, such as MBMS or CBS, or point-to-point communication, such as SMS. While not shown in FIG. 5, once a determination has been made, the group message may be delivered to the devices using the determined delivery mechanisms.

Figure 6:
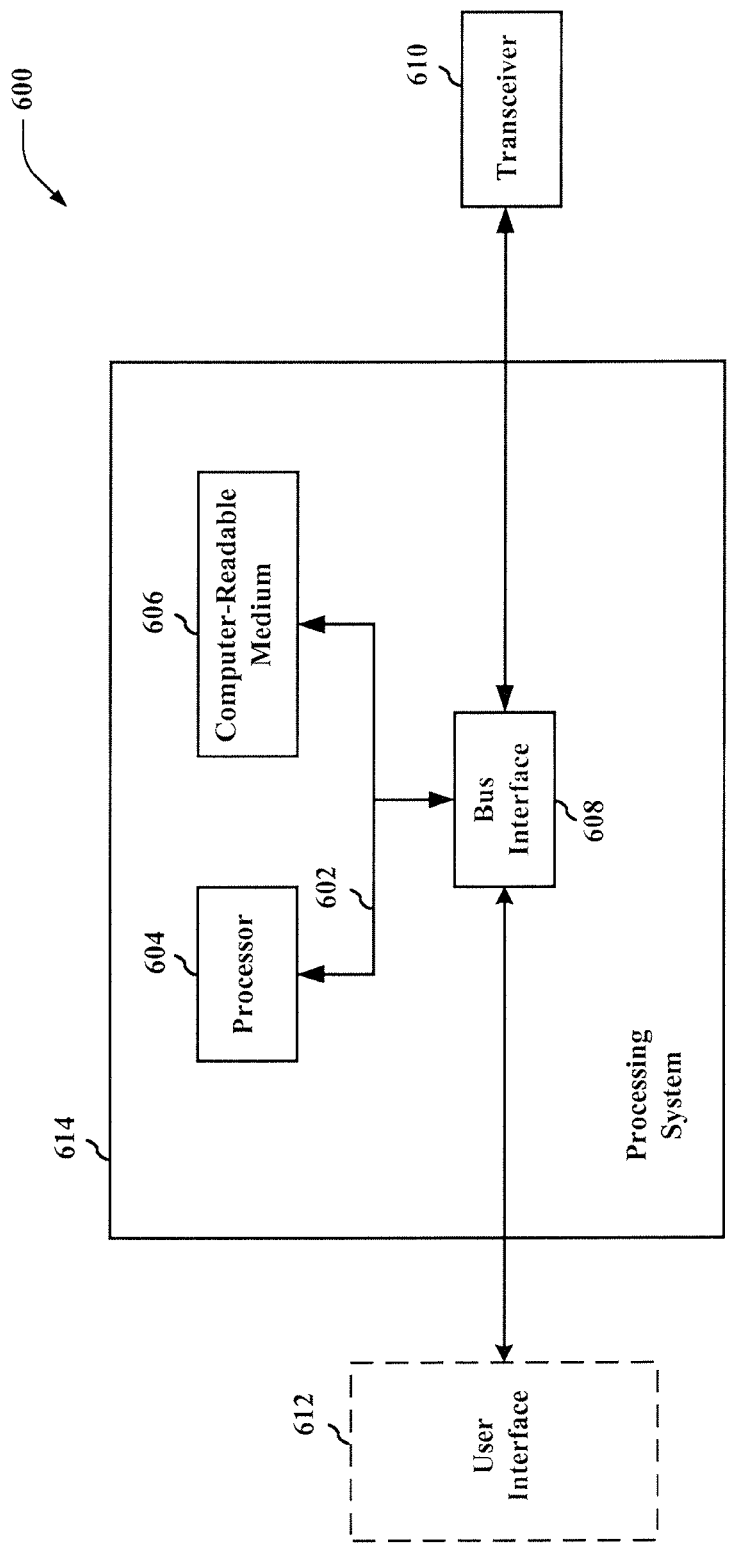
FIG. 6 is a diagram illustrating an example of a hardware implementation for an apparatus employing a processing system.

FIG. 6 is a conceptual diagram illustrating an example of a hardware implementation for an apparatus 600 employing a processing system 614. For example, HSS/HLR 142 and/or MTC IWF 160 may be employ apparatus 600. In this example, the processing system 614 may be implemented with a bus architecture, represented generally by the bus 602. The bus 602 may include any number of interconnecting buses and bridges depending on the specific application of the processing system 614 and the overall design constraints. The bus 602 links together various circuits including one or more processors, represented generally by the processor 604, and computer-readable media, represented generally by the computer-readable medium 606. The bus 602 may also link various other circuits such as timing sources, peripherals, voltage regulators, and power management circuits, which are well known in the art, and therefore, will not be described any further. A bus interface 608 provides an interface between the bus 602 and a transceiver 610. The transceiver 610 provides a means for communicating with various other apparatus over a transmission medium. Depending upon the nature of the apparatus, a user interface 612 (e.g., keypad, display, speaker, microphone, joystick) may also be provided.

The processor 604 is responsible for managing the bus 602 and general processing, including the execution of software stored on the computer-readable medium 606. The software, when executed by the processor 604, causes the processing system 614 to perform the various functions described infra for any particular apparatus. The computer-readable medium 606 may also be used for storing data that is manipulated by the processor 604 when executing software.

Figure 7:
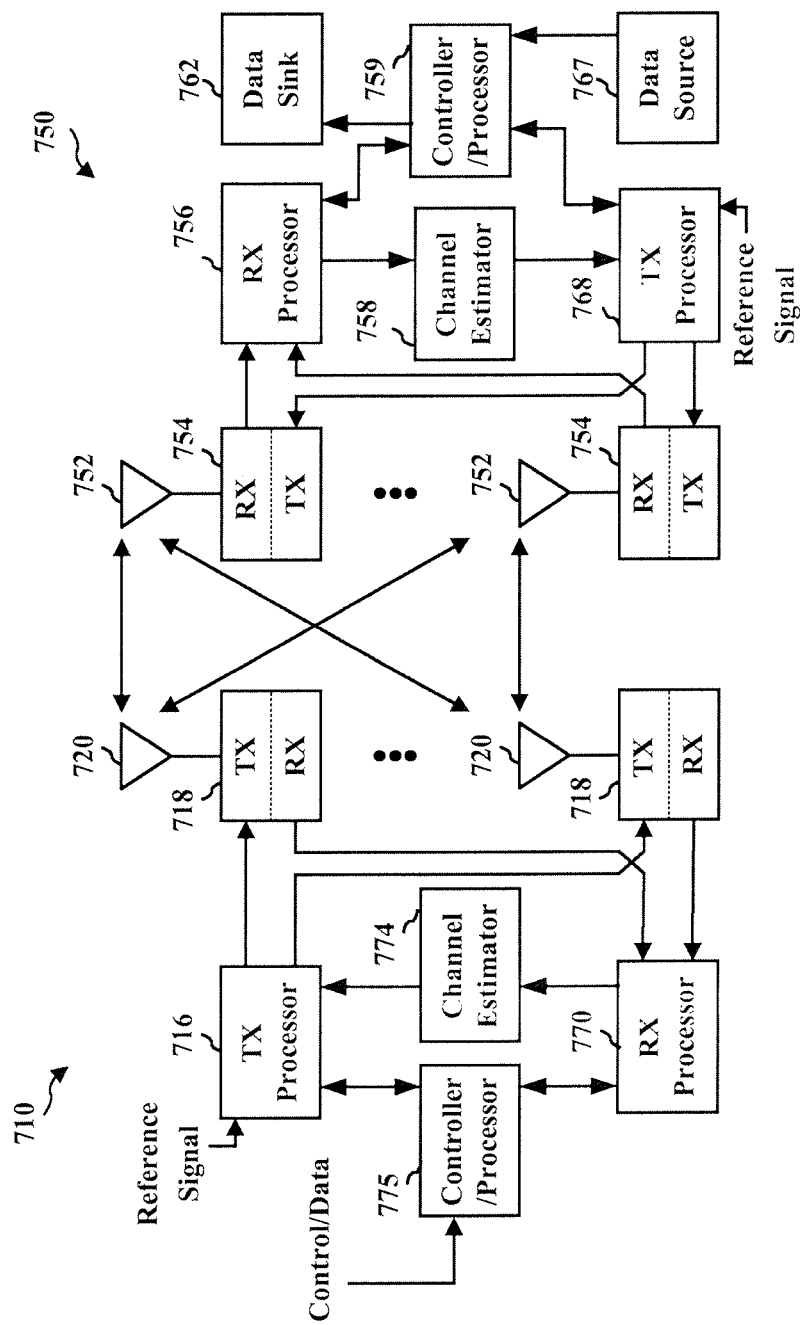
FIG. 7 is a diagram illustrating an example of an evolved Node B and user equipment in an access network.

FIG. 7 is a block diagram of an eNB 710 in communication with a UE 850 in an access network. In the DL, upper layer packets from the core network are provided to a controller/processor 775. The controller/processor 775 implements the functionality of the L2 layer. In the DL, the controller/processor 775 provides header compression, ciphering, packet segmentation and reordering, multiplexing between logical and transport channels, and radio resource allocations to the UE 750 based on various priority metrics. The controller/processor 775 is also responsible for HARQ operations, retransmission of lost packets, and signaling to the UE 750.

The TX processor 716 implements various signal processing functions for the L1 layer (i.e., physical layer). The signal processing functions includes coding and interleaving to facilitate forward error correction (FEC) at the UE 750 and mapping to signal constellations based on various modulation schemes (e.g., binary phase-shift keying (BPSK), quadrature phase-shift keying (QPSK). M-phase-shift keying (M-PSK), M-quadrature amplitude modulation (M-QAM)). The coded and modulated symbols are then split into parallel streams. Each stream is then mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 774 may be used to determine the coding and modulation scheme, as well as for spatial processing. The channel estimate may be derived from a reference signal and/or channel condition feedback transmitted by the UE 750. Each spatial stream is then provided to a different antenna 720 via a separate transmitter 718TX. Each transmitter 718TX modulates an RF carrier with a respective spatial stream for transmission.

At the UE 750, each receiver 754RX receives a signal through its respective antenna 752. Each receiver 754RX recovers information modulated onto an RE carrier and provides the information to the receiver (RX) processor 756.

The RX processor 756 implements various signal processing functions of the L1 layer. The RX processor 756 performs spatial processing on the information to recover any spatial streams destined for the UE 750. If multiple spatial streams are destined for the UE 750, they may be combined by the RX processor 756 into a single OFDM symbol stream. The RX processor 756 then converts the OFDM symbol stream from the time-domain to the frequency domain using a Fast Fourier Transforms (FFT). The frequency domain signal comprises a separate OFDM symbol stream for each subcarrier of the OFDM signal. The symbols on each subcarrier, and the reference signal, is recovered and demodulated by determining the most likely signal constellation points transmitted by the eNB 710. These soft decisions may be based on channel estimates computed by the channel estimator 758. The soft decisions are then decoded and deinterleaved to recover the data and control signals that were originally transmitted by the eNB 710 on the physical channel. The data and control signals are then provided to the controller/processor 759.

The controller/processor 759 implements the L2 layer. In the UL, the control/processor 759 provides demultiplexing between transport and logical channels, packet reassembly, deciphering, header decompression, control signal processing to recover upper layer packets from the core network. The upper layer packets are then provided to a data sink 762, which represents all the protocol layers above the L2 layer. Various control signals may also be provided to the data sink 762 for L3 processing. The controller/processor 759 is also responsible for error detection using an acknowledgement (ACK) and/or negative acknowledgement (NACK) protocol to support HARQ operations.

In the UL, a data source 767 is used to provide upper layer packets to the controller/processor 759. The data source 767 represents all protocol layers above the L2 layer (L2). Similar to the functionality described in connection with the DL transmission by the eNB 710, the controller/processor 759 implements the L2 layer for the user plane and the control plane by providing header compression, ciphering, packet segmentation and reordering, and multiplexing between logical and transport channels based on radio resource allocations by the eNB 710. The controller/processor 759 is also responsible for HARQ operations, retransmission of lost packets, and signaling to the eNB 710.

Channel estimates derived by a channel estimator 758 from a reference signal or feedback transmitted by the eNB 710 may be used by the TX processor 768 to select the appropriate coding and modulation schemes, and to facilitate spatial processing. The spatial streams generated by the TX processor 768 are provided to different antenna 752 via separate transmitters 754TX. Each transmitter 754TX modulates an RF carrier with a respective spatial stream for transmission.

The UL transmission is processed at the eNB 710 in a manner similar to that described in connection with the receiver function at the UE 750. Each receiver 718RX receives a signal through its respective antenna 720. Each receiver 818RX recovers information modulated onto an RF carrier and provides the information to a RX processor 770. The RX processor 770 implements the L1 layer.

The controller/processor 759 implements the L2 layer. In the UL, the control/processor 759 provides demultiplexing between transport and logical channels, packet reassembly, deciphering, header decompression, control signal processing to recover upper layer packets from the UE 750. Upper layer packets from the controller/processor 775 may be provided to the core network. The controller/processor 759 is also responsible for error detection using an ACK and/or NACK protocol to support HARQ operations.

The processing system 614 described in relation to FIG. 6 may include the eNB 710, in some aspects. In particular, the processing system 614 includes the TX processor 716, the RX processor 770, and the controller/processor 775. The processing system 114 described in relation to FIG. 6 may include the UE 750 in some aspects. In particular, the processing system 614 includes the TX processor 768, the RX processor 756, and the controller/processor 759.

It is understood that the specific order or hierarchy of steps in the processes disclosed is an illustration of exemplary approaches. Based upon design preferences, it is understood that the specific order or hierarchy of steps in the processes may be rearranged. The accompanying method claims present elements of the various steps in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the lull scope consistent with the language claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112, sixth paragraph, unless the element is expressly recited using the phrase "means for" or, in the case of a method claim, the element is recited using the phrase "step for."

The invention claimed is:

1. A method for group communication, comprising:
receiving, at a machine-type communication (MTC) interworking function (MTC IWF), a group message request including a group message and a group identifier;
mapping, by the MTC IWF in response to receiving the group message request, the group identifier to a temporary mobile group identifier (TMGI) or other message identifier associated with the group message;
obtaining, from a home subscriber service (HSS) or a home location service (HLR), subscriber information for each device of a plurality of devices in a group identified by the group identifier or TMGI or other message identifier, wherein the subscriber information comprises, for each device in the group, a device identifier and one or more delivery mechanisms supported by the device, with each device providing the one or more delivery mechanisms supported by the device to the HSS or HLR;
determining, by a decision component of the MTC IWF and based, at least in part, on the one or more delivery mechanisms supported by each device, a message delivery mechanism for delivering the group message to each device or subgroup of devices in the group, wherein a first delivery mechanism is determined for a first device in the group and a second delivery mechanism is determined for a subgroup of devices including a plurality of second devices in the group, with the first delivery mechanism being different than the second delivery mechanism;

transmitting the group message to the first device in the group in response to determining the first delivery mechanism for the first device, the transmission to the first device including a subscription identifier associated with the first device, via a point-to-point protocol as the first delivery mechanism; and transmitting the group message to the plurality of second devices in response to determining the second delivery mechanism for the plurality of second devices, the transmission to the plurality of second devices including the group identifier, via a one-to-many communication protocol as the second different delivery mechanism.

2. The method of claim 1, wherein the determining is further based on one or more of a radio access technology supported by each device or subgroup of devices, serving public mobile land network (PLMN) capabilities, and one or more communication policies associated with each device or subgroup of devices.

3. The method of claim 1, wherein the one-to-many communication protocol includes cell broadcast service (CBS) or multimedia broadcast multicast service (MBMS).

4. The method of claim 1, wherein the obtaining comprises:

transmitting a subscriber information request to the HSS or the HLR indicating the group identifier; and receiving, from the HSS or the HLR, a subscriber information answer including, for each device of the plurality of devices, the one or more supported delivery mechanisms and an address associated with a server providing each supported delivery mechanism.

5. The method of claim 1, wherein transmitting the group message to the plurality of second devices in the group identified by the group identifier further comprises:

transmitting a service identifier for each device in the plurality of second devices, the service identifier being mapped to the group message.

6. The method of claim 5, wherein the service identifier is a temporary mobile group identifier (TMGI).

7. The method of claim 1, wherein the group message is a device trigger request.

8. The method of claim 1, wherein the group message request is received from a MTC services capability server (SCS).

9. A non-transitory computer-readable medium storing computer executable code, comprising code to:

receive, at a machine-type communication (MTC) interworking function (MTC IWF), a group message request including a group message and a group identifier;

map, by the MTC IWF in response to receiving the group message request, the group identifier to a temporary mobile group identifier (TMGI) or other message identifier associated with the group message;

obtain, from a home subscriber service (HSS) or a home location service (HLR), subscriber information for each device of a plurality of devices in a group identified by the group identifier or TMGI or other message identifier, wherein the subscriber information comprises, for each device in the group, a device identifier and one or more delivery mechanisms supported by the device, with each device providing the one or more delivery mechanisms supported by the device to the HSS or HLR;

determine, by a decision component of the MTC IWF and based, at least in part, on the one or more delivery mechanisms supported by each device, a message delivery mechanism for delivering the group message to each device or subgroup of devices in the group, wherein a first delivery mechanism is determined for a first device in the group and a second delivery mechanism is determined for a subgroup of devices including a plurality of second devices in the group, with the first delivery mechanism being different than the second delivery mechanism;

transmit the group message to the first device in the group in response to determining the first delivery mechanism for the first device, the transmission to the first device including a subscription identifier associated with the device, via a point-to-point protocol as the first delivery mechanism; and transmit the group message to the plurality of second devices in response to determining the second delivery mechanism for the plurality of second devices, the transmission to the plurality of second devices including the group identifier, via a one-to-many communication protocol as the second different delivery mechanism.

10. The non-transitory computer readable medium of claim 9, wherein the group message request is received from a MTC services capability server (SCS).

11. An apparatus for group communication, comprising:

a processing system configured to:

receive, at a machine-type communication (MTC) interworking function (MTC IWF), a group message request including a group message and a group identifier;

map, by the MTC IWF in response to receiving the group message request, the group identifier to a temporary mobile group identifier (TMGI) or other message identifier associated with the group message;

obtain, from a home subscriber service (HSS) or a home location service (HLR), subscriber information for each device of a plurality of devices in a group identified by the group identifier or TMGI or other message identifier, wherein the subscriber information comprises, for each device in the group, a device identifier and one or more delivery mechanisms supported by the device, with each device providing the one or more delivery mechanisms supported by the device to the HSS or HLR;

determine, by a decision component of the MTC IWF and based, at least in part, on the one or more delivery mechanisms supported by each device, a message delivery mechanism for delivering the group message to each device or subgroup of devices in the group, wherein a first delivery mechanism is determined for a first device in the group and a second delivery mechanism is determined for a subgroup of devices including a plurality of second devices in the group, with the first delivery mechanism being different than the second delivery mechanism;

transmit the group message to the first device in the group in response to determining the first delivery mechanism for the first device, the transmission to the first device including a subscription identifier associated with the device, via a point-to-point protocol as the first delivery mechanism; and transmit the group message to the plurality of second devices in response to determining the second delivery mechanism for the plurality of second devices, the transmission to the plurality of second devices including the group identifier, via a one-to-many communication protocol as the second different delivery mechanism.

12. The apparatus of claim 11, wherein the determining is further based on one or more of a radio access technology supported by each device or subgroup of devices, serving public mobile land network (PLMN) capabilities, and one or more communication policies associated with each device or subgroup of devices.

13. The apparatus of claim 11, wherein the one-to-many communication protocol includes cell broadcast service (CBS) or multimedia broadcast multicast service (MBMS).

14. The apparatus of claim 11, wherein the processing system is further configured to:
    transmit a subscriber information request to the HSS or the HLR indicating the group identifier; and
    receive, from the HSS or the HLR, a subscriber information answer including, for each device of the plurality of devices, the one or more supported delivery mechanisms and an address associated with a server providing each supported delivery mechanism.

15. The apparatus of claim 11, wherein transmitting the group message to a plurality of second devices in the group identified by the group identifier further comprises:
    transmitting a service identifier for each device in the plurality of second devices, the service identifier being mapped to the group message.

16. The apparatus of claim 15, wherein the service identifier is a temporary mobile group identifier (TMGI).

17. The apparatus of claim 11, wherein the group message is a device trigger request.

18. The apparatus of claim 11, wherein the group message request is received from a MTC services capability server (SCS).

* * * * *